E. C. ANDERSON.
LOCOMOTIVE CONSTRUCTION.
APPLICATION FILED JAN. 18, 1918.
1,273,805.
Patented July 30, 1918.
2 SHEETS—SHEET 1.
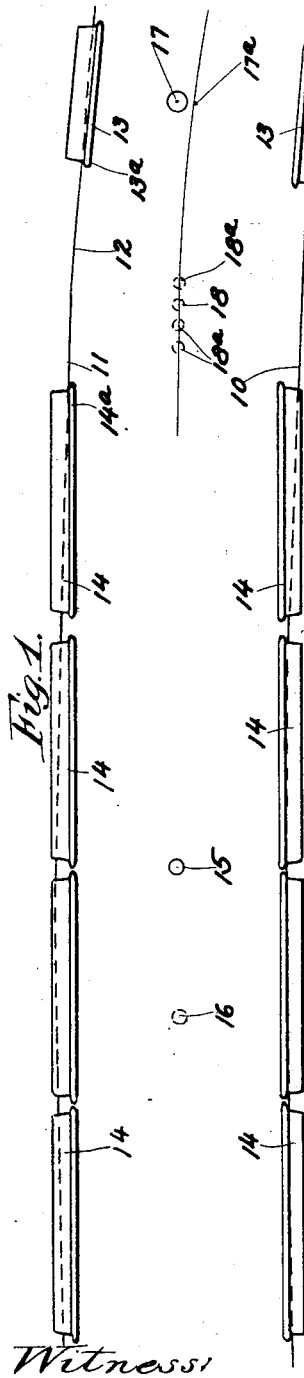
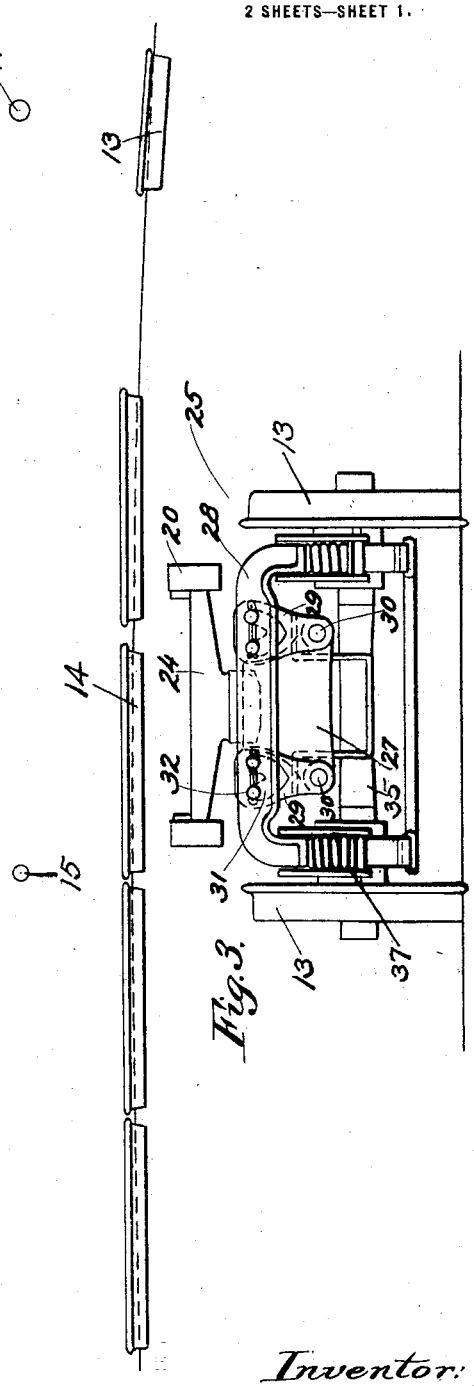
Witness:
C. C. Burnap
Inventor:
Emil C. Anderson
By Sheridan, Sheridan & Smith, Attys.

E. C. ANDERSON.
LOCOMOTIVE CONSTRUCTION.
APPLICATION FILED JAN. 18, 1918.
1,273,805.
Patented July 30, 1918.
2-SHEETS—SHEET 2.
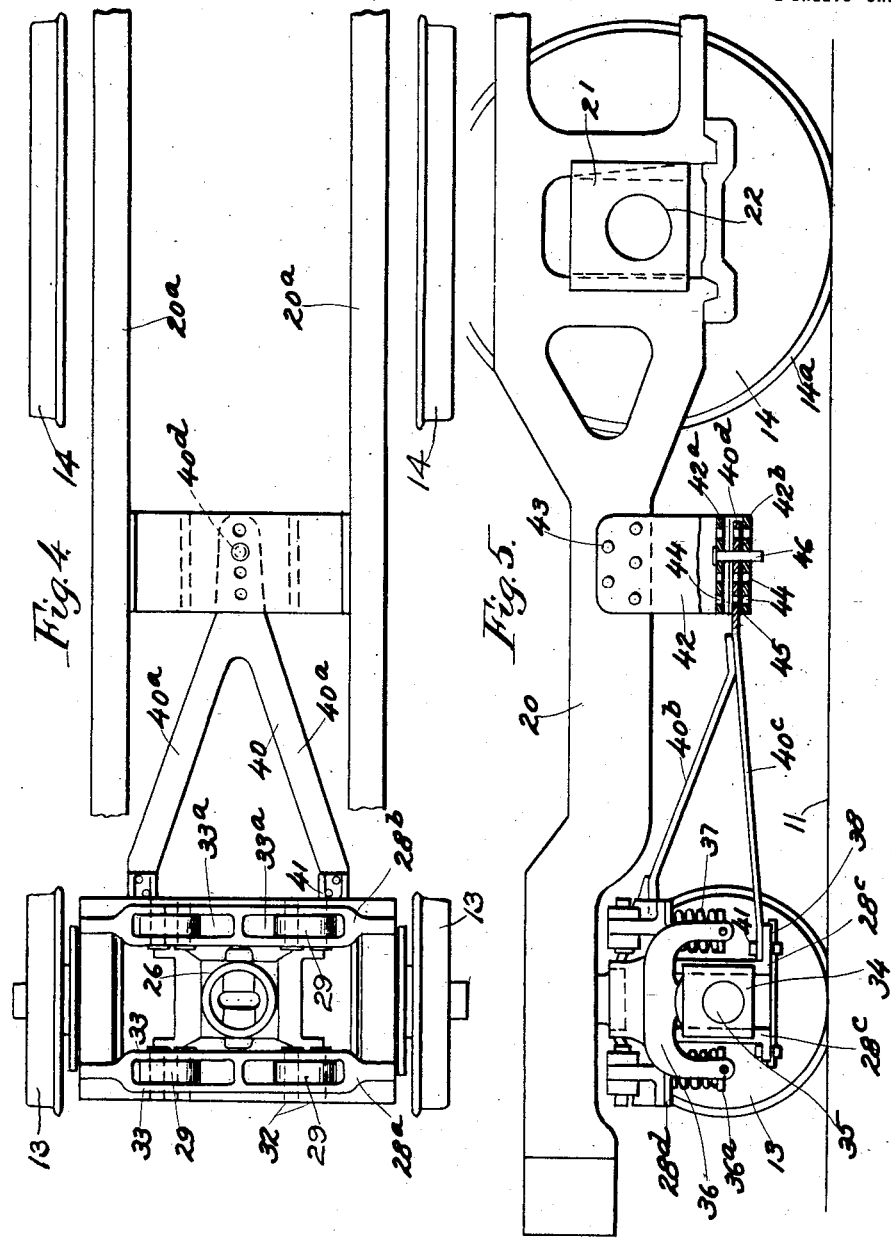
Witness:
C. C. Burnap
Inventor:
Emil C. Anderson
By Sheridan, Sheridan & Smith, Attys

UNITED STATES PATENT OFFICE.

EMIL C. ANDERSON, OF DENVER, COLORADO.

LOCOMOTIVE CONSTRUCTION.

1,273,805.     Specification of Letters Patent.     Patented July 30, 1918.

Application filed January 18, 1918. Serial No. 212,450.

*To all whom it may concern:*

Be it known that I, EMIL C. ANDERSON, a citizen of the United States, residing at Denver, in the county of Denver and State of Colorado, have invented certain new and useful Improvements in Locomotive Construction, of which the following is a specification.

This invention relates to locomotive construction, and its purpose is to provide means for equalizing and compensating for wear on the flanges of the locomotive driving wheels and other parts of the locomotive construction.

The principal object of the invention is to equalize and reduce the flange wear on the driving wheels by providing the locomotive with an adjustable engine truck radius bar as a part of its permanent equipment. By means of this invention the action of the engine truck in guiding the locomotive may be regulated as desired in order to secure the most effective guiding action throughout the life of the locomotive.

It is commonly understood by those skilled in the art that the leading truck of a locomotive is intended to guide the substantially rigid driving wheel base around curves and to keep it in alinement with the track on which it runs. The guiding action of a two-wheeled leading truck, for example, can be modified by lengthening or shortening its radius bar, or the distance from the center of the leading truck axle to the fulcrum about which the radius bar revolves. On entering a curve, the flange of the front driving wheel at the outside of the curve will grind against the outer rail of the track and cause undue wear on the rail and flange unless some means is used for moving the flange away from the rail. The wearing effect is continuous throughout the length of the curve if no means is introduced to move the front driving wheel flange away from the outer rail. The point about which the rigid driving wheel base rotates is theoretically midway between the front and rear driving wheel axles; but practically, on account of the varying clearance between the driving wheel flanges and the heads of the rails, on account of unequal grooving of the driving wheel tires, and because of unequal lateral motion in driving wheel journal boxes and other causes, the pivotal point is somewhere between the theoretical point and the rear driving wheel axle.

If this pivotal point about which the locomotive frame turns had a constant position, a length of radius bar could be found for each particular locomotive which would give the best result in guiding action and reduction of flange wear. In practice, however, no two locomotives have the same pivotal point, and further, on any one locomotive the pivotal point will vary depending upon whether it is newly out of the shop or has accumulated wear in service. It is also true that a locomotive having a radius bar of proper length on a track having long easy curves would require a shorter radius bar if it were transferred to a railway track full of sharp curves, if the flange wear is to remain equal on each track. It is evident therefore that the shorter the radius bar is made, the quicker the leading truck will act in guiding the front driving wheel flange away from the outer rail, and it is plain that the sharper the curve the quicker should the guiding action take place.

The present invention overcomes the difficulties heretofore encountered by providing means for adjusting the action of the front guiding truck, so that it will operate to steer and guide the locomotive frame efficiently at all times regardless of the nature of the track or the length of service of the locomotive. In the structure herein illustrated, this adjustability is obtained by providing a radius bar, the effective length of which is adjustable in order to compensate for the variation in position of the pivotal point about which the rigid wheel base turns. Other objects of the invention relate to various features of construction and arrangement which will appear more fully hereinafter.

The nature of the invention will be understood from the accompanying drawings in which one embodiment thereof is illustrated.

In the drawings—

Figure 1 shows a somewhat diagrammatic plan view of a section of railway track illustrating the positions of the front truck wheels and the driving wheels shortly after entering a curve;

Fig. 2 is a view similar to Fig. 1, showing the positions of the front truck wheels and the driving wheels of the locomotive after the guiding wheels have acted to steer the outer forward driving wheel away from the outside rail;

Fig. 3 shows a front elevation of the front truck of a locomotive embodying the features of this invention;

Fig. 4 shows a top plan view of the forward portion of the locomotive with parts thereof removed to illustrate the front truck and radius bar and the means for connecting the same to the locomotive frame; and Fig. 5 shows an enlarged side elevation of the construction illustrated in Fig. 4.

In Fig. 1 of the drawings the rails 10 and 11 of a railway track are represented by lines which correspond to the inner surfaces of the heads of the rails, and the track so formed is shown as comprising a curve 12 which is about to be entered by the locomotive having forward truck wheels 13 and a plurality of pairs of driving wheels 14. Shortly after the locomotive runs into the curve, the flange 13ª of the outer wheel 13 of the forward truck will engage the outer rail 11, and the flange 14ª of the outer forward driving wheel will engage the outer rail 11, and it is the function of the forward truck to guide the flanges of the driving wheels away from the heads of the rails in order to reduce the friction and the wear on the flanges of the wheels. In performing this function, the forward truck guides the locomotive frame, which, as it rounds the curve, turns about a pivotal point which is theoretically located at 15 beneath the longitudinal axis of the locomotive. As previously stated, the wear on the flanges of the wheels, and other causes met in practice, results in the pivotal axis or turning point being located at 16, some distance between the theoretical point 15 and the axle of the rear driving wheels 14 of the locomotive. It is therefore necessary for the forward truck carrying the wheels 13 to guide the driving wheels and the locomotive frame about a pivotal axle 16, the position of which is variable, depending upon the length of service of the locomotive and other factors.

When the forward truck of the locomotive runs off of the straight track onto the curve, the middle point 17 of the forward axle moves transversely to a point 17ª, and in so doing the forward truck swings laterally about a pivotal point 18, which represents the pivotal attachment of the radius bar to the frame of the locomotive. The inclination of the axle of the wheels 13, with respect to the longitudinal axis of the locomotive frame, depends upon the distance from that axle to the point 18, and it will be apparent that if this distance be relatively short in order to cause the wheels 13 to swing through a sharper angle, these wheels 13 will act more quickly in directing the flanges 14ª of the forward driving wheel away from the outer rail 11. Fig. 2 of the drawings illustrates the position of the forward wheels and the driving wheels of the locomotive after the front truck has passed further around the curve and has guided the flange 14ª of the outer forward driving wheel away from the rail 11. It will be seen that in this view the flange of the outer forward driving wheel, and also the flange of the forward truck wheel 13, are moved away from the outer rail 11, so that no grinding action occurs on the flanges of these wheels. The forward driving wheel on the inside of the curve has moved inwardly, but its flange has not yet engaged the rail head, and at the same time the inner wheel 13 of the forward truck has moved inwardly to a point where its flange 13ª has almost reached the head of the inner rail 10. As the movement of the locomotive around the curve continues, the front truck wheels operate to maintain a minimum grinding action between the flanges of the wheels and the heads of either the inner or the outer rails, while at the same time directing the rigid frame of the locomotive around the curve. The farther the pivotal point 18 of the forward truck is moved forward, the greater will be the angularity of the engine truck axle, with the consequence that the truck will move more quickly toward the inside rail, and in so doing it moves the front driving wheel flange away from the outer rail of the curve more quickly than would be the case if the distance between the pivotal point 18 and the point 17 were increased. If the effective length of the radius bar be too short there is danger that the engine truck may move over too quickly when engaging a curve and climb the inside rail, and, in general, the radius bar should be kept as long as possible without causing undue wear upon the driving wheel flanges. In order to compensate for the wear upon the flanges and for the variation of the position of the pivotal axis 16 about which the rigid locomotive frame turns, I provide means for varying the position of the pivotal point 18 about which the engine truck turns, so that it may be caused to assume any one of a plurality of positions 18ª and thus secure the most efficient action at all times throughout the life of the locomotive.

Upon referring more particularly to Figs. 3, 4, and 5 of the drawings, it will be seen that the locomotive frame 20 has two parallel side frame members 20ª, which are mounted on the journal boxes of the driving wheel axles. In Fig. 5 the frame 20 is shown mounted in any approved manner upon the driving journal box 21 of the axle 22 which carries the forward driving wheels 14, previously described, having flanges 14ª. The front end of the frame 20 carries a bolster 24 which rests upon the front engine truck designated generally by the numeral 25. The bolster 24 is connected through a suitable bolster pin with the bolster plate 26 which is carried by the member 27 hung from the front truck frame 28 by means of the hangers 29. These hangers are pivotally connected to the member 27 by pins 30 and are substantially heart-shaped in form, as shown in Fig. 3, being provided in their upper parts with V-shaped slots 31, the upper ends of which are adapted to be engaged by pins 32 extending transversely through the walls 33 of the front and rear frame members 28$^a$ and 28$^b$, respectively, which are provided with slots 33$^a$ to receive the hangers. It will be seen that two hangers 29 are used at each side of the member 27 and that the pivotal connection of the hangers to the frame 28 is adapted to permit lateral motion of the truck frame with respect to the bolster 24 and the locomotive frame 20. Upon lateral motion in either direction of the truck frame, the walls of the V-shaped slots 31 at one end of each slot move upwardly from the pins 32 with which they normally coact. A lifting action is thus introduced into the action of the front truck in moving laterally, so that the motion of the truck is stabilized and its lateral motion governed.

The vertical arms 28$^c$ at the ends of the frame 28 have slidably mounted therein the journal boxes 34 of the front axle 35, which carries the front wheels 13, previously referred to. The journal boxes 34 are engaged at their upper sides by hangers 36 carrying plates 36$^a$ at their ends, adapted to receive coil springs 37 between them and the plates 28$^d$ of the frame, whereby the motion of the journal boxes 34 is regulated. The arms 28$^c$ of the frame are connected at their lower ends by transverse members 38.

The frame 28 of the forward truck is connected to the engine frame at some point rearwardly thereof through the radius bar 40, which is V-shaped in form, as shown in Fig. 4, having two lateral arms 40$^a$ consisting of upper and lower members 40$^b$ and 40$^c$, respectively, which are connected to the truck frame 28 at opposite sides of the longitudinal center thereof by means of bolts 41. The radius bar has a tongue or arm 40$^d$ at its rear end located beneath the longitudinal axis of the locomotive and adapted to extend between the upper and lower plates 42$^a$ and 42$^b$, respectively, of the fulcrum plate or casting 42, which extends between the side frame members 20$^a$ of the locomotive and is secured thereto by bolts 43. In order to permit a variation in the pivotal attachment of the radius bar to the fulcrum casting 42, the plates 42$^a$ and 42$^b$ are provided with a plurality of parallel alining apertures 44, each pair being adapted to register with one of the apertures 45 in the arm 40$^d$ of the radius bar. The fulcrum pin 46 may be caused to engage any desired set of apertures 44 and 45 in order to vary the effective length of the radius bar and thereby regulate the action of the forward truck in guiding the driving wheels of the locomotive. By means of this construction the fulcrum pin can be moved forward or backward to secure the desired steering action corresponding to the condition of the flanges of the driving wheels as to wear and the like. The operation of varying the effective length of the radius bar can be performed in a very short period of time, and it will be understood that the adjustment may be made by other means than that herein illustrated, such as by the use of a slidably mounted fulcrum block.

The present invention may be applied to the trailing truck of a locomotive in order to vary its guiding or steering action, and the improvement may further be used on four-wheeled leading or trailing trucks as well as on two-wheeled trucks generally used. I claim as my invention the use of an adjustable radius bar in connection with leading or trailing trucks having two or more wheels, and the improvement may also be applied to an articulated locomotive fitted with two or more rigid driving wheel bases flexibly connected to each other; in such a locomotive the guiding action of either rigid wheel base can be varied by the use of my invention, in which case the adjustable feature would be applied at the point or points where the two or more rigid wheel bases are hinged together.

Although I have shown and described a particular embodiment of the invention for purposes of illustration, it will be understood that it may be constructed in various different forms without departing from the scope of the appended claims.

What I claim is:

1. In a locomotive, a guiding truck having a radius bar, and means for connecting said radius bar to the body of said locomotive, the operative position of said connecting means being adjustable.

2. The combination in a locomotive having two wheeled truck frames, of means for pivotally connecting said truck frames together, and means for varying the position of the pivotal connection longitudinally of the locomotive.

3. The combination in a locomotive having driving wheels, of a guiding truck having movement about a pivotal axis with respect to the body of the locomotive, and means for varying the position of said pivotal axis.

4. In a locomotive, a frame, driving wheels supporting said frame, a guiding truck operatively connected to said frame, and means for adjusting the operative connection of said truck and said frame to vary the action of said truck in guiding said driving wheels.

5. The combination in a locomotive having driving wheels, of a guiding truck having movement with respect to the body of the locomotive about a pivotal axis displaced longitudinally of the locomotive from the body of said truck, and means for varying the position of said pivotal axis.

6. The combination in a locomotive having driving wheels, of a guiding truck having lateral movement with respect to the body of the locomotive, a radius bar carried by said truck and extending therefrom longitudinally of the locomotive, means for pivotally connecting said radius bar to the body of the locomotive, and means for varying the position of said pivotal connection longitudinally of said locomotive.

7. The combination in a locomotive having driving wheels, of a guiding truck having lateral movement with respect to the forward part of said locomotive, a radius bar secured to said truck and extending rearwardly therefrom, a supporting member mounted beneath the body of said locomotive adjacent the rear end of said radius bar, means for pivotally connecting said supporting member to said radius bar, and means for varying the point of said pivotal connection longitudinally of said locomotive.

8. The combination in a locomotive having driving wheels, of a front truck having a frame mounted beneath the forward end of said locomotive, a member connected to the forward end of said locomotive and suspended from said frame of said truck, a radius bar secured to the frame of said truck and extending rearwardly therefrom, means for pivotally connecting the rear end of said radius bar to the body of said locomotive, and means for varying the position of said pivotal connection longitudinally of said locomotive.

9. The combination in a locomotive having driving wheels, of a guiding truck mounted beneath the body of the locomotive and having lateral movement relative thereto, a radius bar secured to said truck and extending therefrom longitudinally of the locomotive, said radius bar having a plurality of apertures therein spaced apart longitudinally of said truck, a supporting member secured to the body of said locomotive and having a plurality of apertures therethrough, and a pin adapted to engage any desired pair of apertures in said member and said radius bar.

In testimony whereof, I have subscribed my name.

EMIL C. ANDERSON.

Witnesses:
 GEORGE W. WHITE,
 S. J. O'DAY.